Oct. 14, 1958

C. M. CLARK 2,856,537

CIRCULAR SCANNING SYSTEM FOR RECORDING NUCLEAR ENERGY SPECTRUM

Filed Aug. 23, 1954

INVENTOR
CALVIN M. CLARK
BY
ATTORNEYS

Oct. 14, 1958

C. M. CLARK 2,856,537

CIRCULAR SCANNING SYSTEM FOR RECORDING
NUCLEAR ENERGY SPECTRUM

Filed Aug. 23, 1954

INVENTOR
CALVIN M. CLARK
BY
ATTORNEYS

United States Patent Office 2,856,537
Patented Oct. 14, 1958

2,856,537
CIRCULAR SCANNING SYSTEM FOR RECORDING NUCLEAR ENERGY SPECTRUM

Calvin M. Clark, Fullerton, Calif., assignor to California Research Corporation, San Francisco, Calif., a corporation of Delaware Application August 23, 1954, Serial No. 451,525

11 Claims. (Cl. 250—71)

The present invention relates to a method of, and apparatus for, transmitting high-frequency forms of intelligence over a well logging cable of limited frequency and power transmission characteristics, more particularly to a method of recording a spectrum of nuclear energies, such as gamma rays, generated in earth strata traversed by a well bore at the earth's surface, utilizing a convention D. C. well logging cable, and has for an object the provision of an improved method of storing electrical signals corresponding to individual gamma ray energies measured simultaneously during neutron bombardment of an earth formation by converting the individual gamma ray energy to an electrostatic charge and positioning said electrical charges on a circular storage surface in a circular pattern, wherein the radius of the circle of said pattern is selected in accordance with the magnitude of said electrical signal. The circularly and regularly positioned electrostatic charges are then converted to a modulated D. C. form of electrical signal by circular scanning of the storage surface and simultaneously varying the radius of the scanning circle to produce an electrical signal which may be transmitted over a standard well logging cable for recording of the gamma ray energy spectrum at the earth's surface.

In logging of earth formations traversed by a well bore, it is frequently desirable to be able to transmit high-frequency forms of intelligence, such as electrical pulses representing gamma ray energies which are of very short duration and very rapidly succeeding each other, over a cable of relatively limited frequency and power transmission characteristics. In particular, it is highly desirable to be able to transmit the electrical pulses corresponding to the individual neutron-capture gamma rays generated simultaneously upon capture of neutrons by the nuclei of constituents of an earth formation lying several thousand feet below the earth's surface. However, this problem has been found so difficult that the solutions suggested for field practice heretofore have required either that the recording be performed "blind," by means such as camera and film, within the well bore adjacent the logging tool or that the signal be transmitted over commercially unavailable coaxial cables. As particularly explained in the application of Delmar O. Seevers, a coemployee, Ser. No. 433,244, filed May 28, 1954, which is assigned to the assignee of the present application, these previously known methods of transmitting high-frequency forms of intelligence have been considered so unattractive that they have retarded or prevented the field use of spectral analysis of earth formations by means of gamma ray energies. As further explained in the said Seevers application, the high-frequency forms of intelligence may be transmitted over a standard well logging cable of limited frequency and power transmission characteristics by conversion of the electrical pulses, corresponding to the individual energy of each gamma ray detected by a scintillation crystal and photo-multiplier tube combination, to an electrostatic charge in a cathode ray tube having an electrostatic storage surface, and then assigning a particular location or position on the electrostatic storage surface for storage of said charges or pulses in accordance with the energy of each gamma ray.

In accordance with the present invention, there is provided a system for greatly increasing the amount of information or intelligence which may be stored on the storage surface by the provision of a system for deflection-modulating the electron beam in the electrostatic storage tube to traverse a circular pattern.

In accordance with one aspect of the present invention, the cathode ray beam, during storage of electrostatic charges on the recording surface of the tube, is modulated by the simultaneous application of sine and cosine signals to the vertical and horizontal deflection plates of the storage tube to cause the cathode ray beam to traverse a circular pattern around the outer circumference of the storage surface. Each pulse representing the energy of an incoming gamma ray detected by the scintillometer is then positioned by radial deflection-modulating of the electron beam so that the writing of the beam on the storage surface corresponds to the energy of each particular gamma ray, and all other rays of equal energy will lie on a circle of the same radius. The arrangement is such that each pulse is placed on a circle having a radius corresponding to the magnitude of the gamma ray energy producing the pulse. The beam is biased below cutoff to prevent recording on said storage surface until such time as the beam is positioned along a circumference of predeterminable radius and then turned on for a time only sufficient to produce an electrostatic charge of small but finite area lying along the arc of a circle corresponding to the energy of the received gamma ray.

Further in accordance with the invention, after a spectrum of gamma ray energies has been accumulated on the storage surface as concentric circles of varying radii and with electrostatic densities dependent upon their abundance in the total signal received, a modulated D. C. signal is generated and transmitted to the surface over a standard low-frequency well logging cable of limited frequency and power transmission characteristics. By energizing the electron beam in said storage tube to a writing condition and modulating the beam to traverse the storage surface in a generally spiral pattern, the D. C. signal is generated and modulated in magnitude in accordance with the radial and circumferential distribution of electrostatic charges on the storage surface. The D. C.-modulated signal may be selectively generated and recorded when desired at the earth's surface.

Further objects and advantages of the present invention will become apparent from the following detailed description taken in conjunction with the accompanying drawings, which form an integral part of the present specification.

Figure 1A:
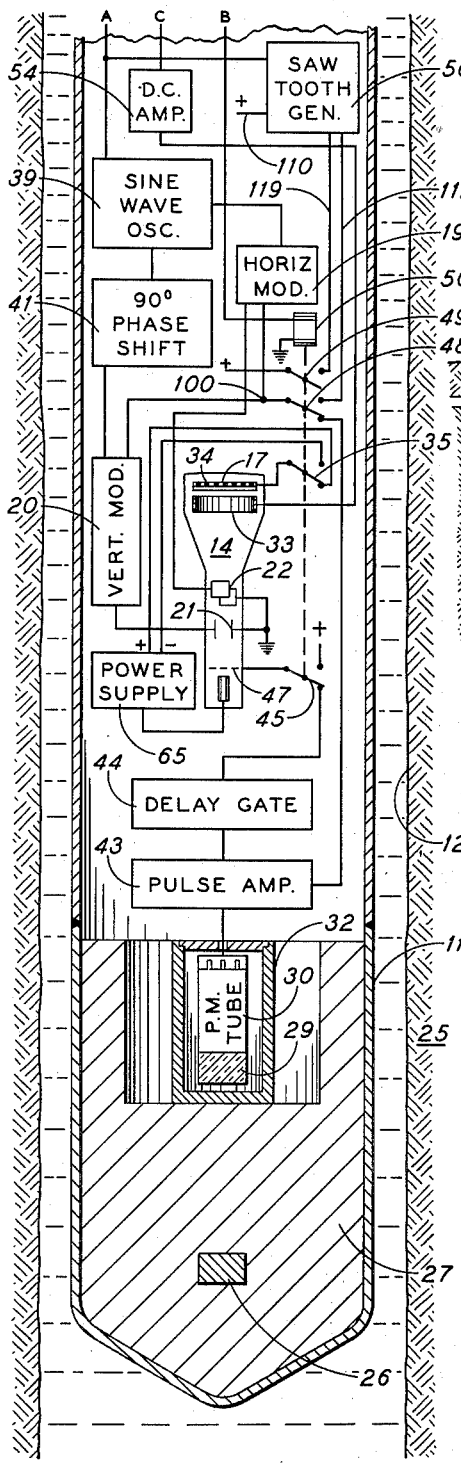
Fig. 1A is a schematic representation of the lower end of a down-hole logging instrument incorporating the method of the present invention as applied to the logging of gamma ray energy spectra.
Figure 1B:
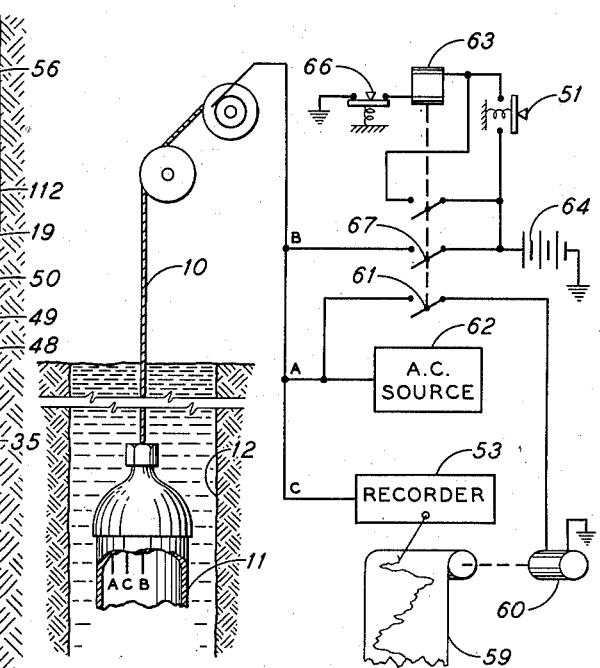
Fig. 1B is a schematic representation of the upper end of the tool in Fig. 1A and the recording and transmitting equipment, together with an indication of the transmission system between the top of the well logging sonde of Fig. 1A and the earth's surface.

Referring now to the drawings, and in particular to Figs. 1A and 1B, there is illustrated a preferred form of apparatus adapted to utilize the method of transmitting high-frequency forms of intelligence over a well logging cable 10 of limited frequency and power transmission characteristics. As shown, a logging sonde 11, wherein the earth formation analysis and signal-generating equipment are located, is adapted to traverse a well bore 12 while supported at the lower end of logging cable 10. For reasons discussed above, well logging cable 10 must have considerable structural strength in order to support the relatively heavy logging sonde 11 as well as several thousand feet of its own length. In order for the cable to be sufficiently small in diameter so that several thousand feet of the cable may be readily handled in field operations, the amount of power and frequency characteristics which can be transmitted over the line is quite limited. In practice, the electrical power is restricted to the order of about 150 watts at not over about 200 volts. Accordingly, when it is desired to be able to transmit information representing individual gamma ray quanta, it has been found difficult to transmit a sufficient amount and quality of data corresponding to a large number of channels of pulses of widely varying magnitudes to the earth's surface so that a useful record may be made simultaneous with the running of the logging sonde 11 in the well bore 12. This is due primarily to the fact that these pulses are each of such short duration and follow in such rapid succession that a high-frequency transmission system is required even when the total amount of information is limited.

In accordance with the present invention, there is provided an improved system for storing a complete spectrum, representing as many as 200 channels of gamma ray energies of varying magnitudes, in which each pulse is stored as an electrostatic charge on a storage surface 17 of a cathode-ray-type storage tube 14. Further, in accordance with the invention, the electrostatic charges representative of individual gamma ray energies are radially positioned and stored in a circular pattern by modulation of the electron beam generated in cathode ray tube 14 in response to vertical modulator 20 and horizontal modulator 19, which are connected to the electrostatic deflection plates 21 and 22, respectively, of the tube.

In the embodiment of the invention illustrated in Fig. 1A, the gamma ray quanta to be stored on the radially deflected and circumferentially distributed pattern arise from simultaneous neutron bombardment of the earth formations, such as 25, by neutrons from source 26 which are captured by nuclei of constituent elements within formation 25. The neutron source 26, which may be a polonium-beryllium source to give large neutron and low gamma ray production, is embedded within a shield 27, such as bismuth, to reduce the number of gamma rays entering the formation and, further, to reduce the number of gamma rays of low energy, which return from the formation. These individual neutron-capture gamma ray quanta, which are characteristic of the individual nuclei in the formations, are then detected by a scintillation counter, which includes a crystal 29, such as sodium iodide activated by thallium and a directly coupled photomultiplier tube 30. As shown, the scintillation counter combination of crystal 29 and photomultiplier tube 30 is preferably enclosed within a further shield 32, which may be constructed of boron in order to prevent thermalized neutrons from entering the detector.

Each electrical pulse from the output of the scintillation counter is made substantially equal in length and proportional in magnitude to each of the gamma ray quanta detected by the counter by linear pulse amplifier 43. These pulses to be useful in well logging operation are of exceptionally short duration (about 0.25 microsecond in duration) and when utilized in a system, such as that contemplated in Fig. 1A, with a high-intensity neutron source, may result in as many as one million counts per second being generated in the electrical circuit. Accordingly, for a direct transmission system of said pulses to the surface, a band width of at least one megacycle, and preferably more, would be required.

In avoidance of the foregoing requirement for a very wide band-pass transmission system, the storage surface 17 of storage tube 14 is arranged through the circuits to be described hereinafter, including vertical modulator 20 and horizontal modulator 19, to store these electrical signals for a predeterminable time interval or, where the logging run is being made at a predeterminable rate, for a time representing a predetermined length of earth formation. Due to the small diameter of the logging sonde 11, preferably in the range of 4 to 5 inches, the storage tube 14 is necessarily limited in area so that it is necessary to store a maximum amount of information on the storage surface 17 during the recording or writing operation. Additionally, the amount of information for particular elemental areas of the storage surface 17 is limited by the practical size to which the electron beam can be confined and, further, the storage surface is limited as to its elemental areas, upon which individual charges can be deposited, by the barrier grid 34 which is indicated as lying between the storage surface 17 and the collector ring 33. Barrier grid 34 is constructed of very fine mesh screen; that is, from 600 to 900 wires per linear inch and thereby limits the number of storage areas.

Figure 2B:
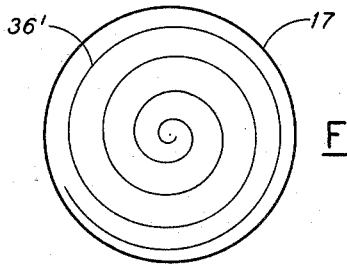
Fig. 2B is a schematic representation of a system in accordance with the present invention for traversing the storage surface of the storage tube during the reading and transmission of the gamma ray energy spectra to the earth's surface.
Figure 2A:
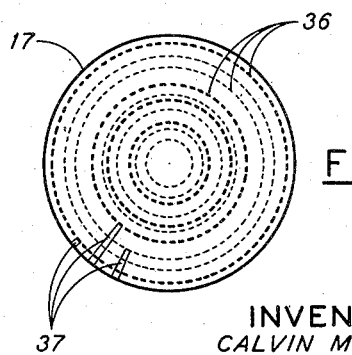
Fig. 2A is a schematic representation of the preferred manner of positioning electrostatic charges on the storage surface of the storage tube within the well logging sonde, as contemplated during the writing operation of the logging procedure.

In accordance with the present invention, the utilization of the storage surface 17 is greatly increased by arranging the deflection circuits to continuously rotate the electron beam substantially concentrically around the center of the circular storage area 17. As shown in Fig. 2A, wherein the elemental charges which may be deposited upon the target circuit are represented as the dashes 36, it will be observed that the individual electrostatic charges are distributed generally around a concentric ring pattern.

In a preferred method of operating the apparatus of Fig. 1A, the vertical modulator 20 and horizontal modulator 19 are energized through a sine wave oscillator 39, with the signal to the vertical modulator and plates 21 shifted ninety degrees electrically with respect to the signal applied by horizontal modulator 20 to plates 22. To this end, there is provided a 90-degree phase shift network, identified as 41. To simplify the illustration in Fig. 1A, one of the plates on both the horizontal and vertical deflection plates has been shown as grounded, but it will be understood that both plates may be operated at any desired potential different from ground.

As a preferred manner of operation, the radial deflection of the electron beam of tube 14 is normally adjusted so that, with minimum input signal being applied to the modulators 19 and 20 by the incoming electrical pulses from pulse amplifier 43, the low-energy gamma rays will be represented by electrostatic charges near the outer periphery of target 17. Correspondingly, the higher-energy pulses will be positioned nearer the center of the target surface. This arrangement for distributing the charges has a particular advantage in the recording of neutron-capture gamma rays where the very high-energy rays, that is, upwards of 7 m. e. v., are of much lower incidence statistically when compared to the gamma ray energies of about 1 m. e. v., the ratio being about 1000:1. Thus, it will be seen that utilizing the relatively large circumferential area around the outer periphery for the low-energy gamma ray pulse storage will permit more effective use of the area of storage target 17.

With reference to the imposition of the electrostatic charges on target 17, Fig. 2A illustrates a preferred method of positioning the charges. The charges are represented by dots 36, which, as shown, indicate that the electrostatic charges are preferably positioned by the electron beam around a plurality of concentric circles. In the present instance the charges on surface 17 are produced by the secondary emission of electrons from the storage surface being greater than unity during the writing or storage operation, and less than unity during the reading or transmission operation. Thus, during storage of electrical pulses, there is produced at each spot where the beam contacts surface 17 a positive charge, due to the substraction of electrons from the elemental areas identified as 36. In accordance with the preferred method of operating the apparatus shown in Fig. 1A, there is provided a control system for tube 14 for causing the electron beam to be gated on only after reception and shaping by the pulse amplifier 43. Thus, the beam will produce charges 36 on target 17 only when each pulse has achieved its maximum amplitude. To this end, delay gate 44 is connected between the control grid 47 of tube 14 and amplifier 43 during the writing operation through contact 45 of relay 50.

After a predeterminable length of formation 25, lying along the well bore, has been investigated, or a predetermined number of gamma rays have been detected and positioned on target surface 17 in the manner described above, the spectrum is transmitted to a surface recording system capable of operating within the power and frequency limitations imposed by well logging cable 10. To this end, storage tube 14 is converted to a reading or transmitting condition by relay 50 within logging sonde 11. Relay 50 is energized from the earth's surface through line B by a starting circuit, including pushbutton 51. With relay 50 energized, each of the electrodes of storage tube 14 are switched to a reading condition; that is, so that the cathode ray beam may be energized with a higher potential capable of returning all of surface 17 to an equal potential and at the same time generate a D. C. or low-frequency current representing the distribution of the electrostatic charges stored on target surface 17 during the writing operation. The collector ring 33 is located within storage tube 14 in a position to detect secondary electrons resulting from the charges deposited thereon. The signal resulting from these secondary electrons is transmitted to the surface recorder 53 over line C by D. C. amplifier 54.

In order to take advantage of the circular system for depositing electrical charges on the face of target 17, during transmission of the gamma ray spectrum, horizontal and vertical modulators 19 and 20 have applied thereto a linearly varying D. C. potential supplied by the saw-tooth generator 56. As further illustrated in Fig. 4, generator 56 is adapted to apply linear varying potential through potentiometer 111, in manner to be described hereinafter, to both modulators and thereby drive the electron beam around the surface of the storage tube in a circle of progressively increasing radius, thus forming a spiral. This direction and movement of the electron beam is particularly illustrated in Fig. 2B by the line indicated as 36′. The direction of movement of the cathode ray beam about a generally spiral path may be performed either by increasing the radius from the center outwardly or by decreasing the radius from the outside toward the inner portion of the target. As indicated on the surface record paper 59, which is desirably driven in synchronism by motor 60 with the movement of the electron beam around the area of target 17, in the preferred embodiment of the invention the radius of curvature of the electron beam is decreased from the outer periphery of the target. For this purpose, motor 60, as well as sine wave oscillator 39 and saw-tooth generator 56, are all energized in common from an A. C. source, designated generally as 62. This source of A. C. is preferably regulated to 60-cycle frequency so that the problem of power transmission over the low-frequency and limited power characteristic cable 10 is not exceeded.

The remainder of the power utilized in the electronic system as thus far described, as well as the high voltage B supply for the vertical and horizontal modulators, are preferably supplied by a power pack, indicated generally as power supply 65 within the logging sonde. Provision of power supply 65 in logging sonde 11 thereby further reduces the power transmission requirements on well logging cable.

Figure 3:
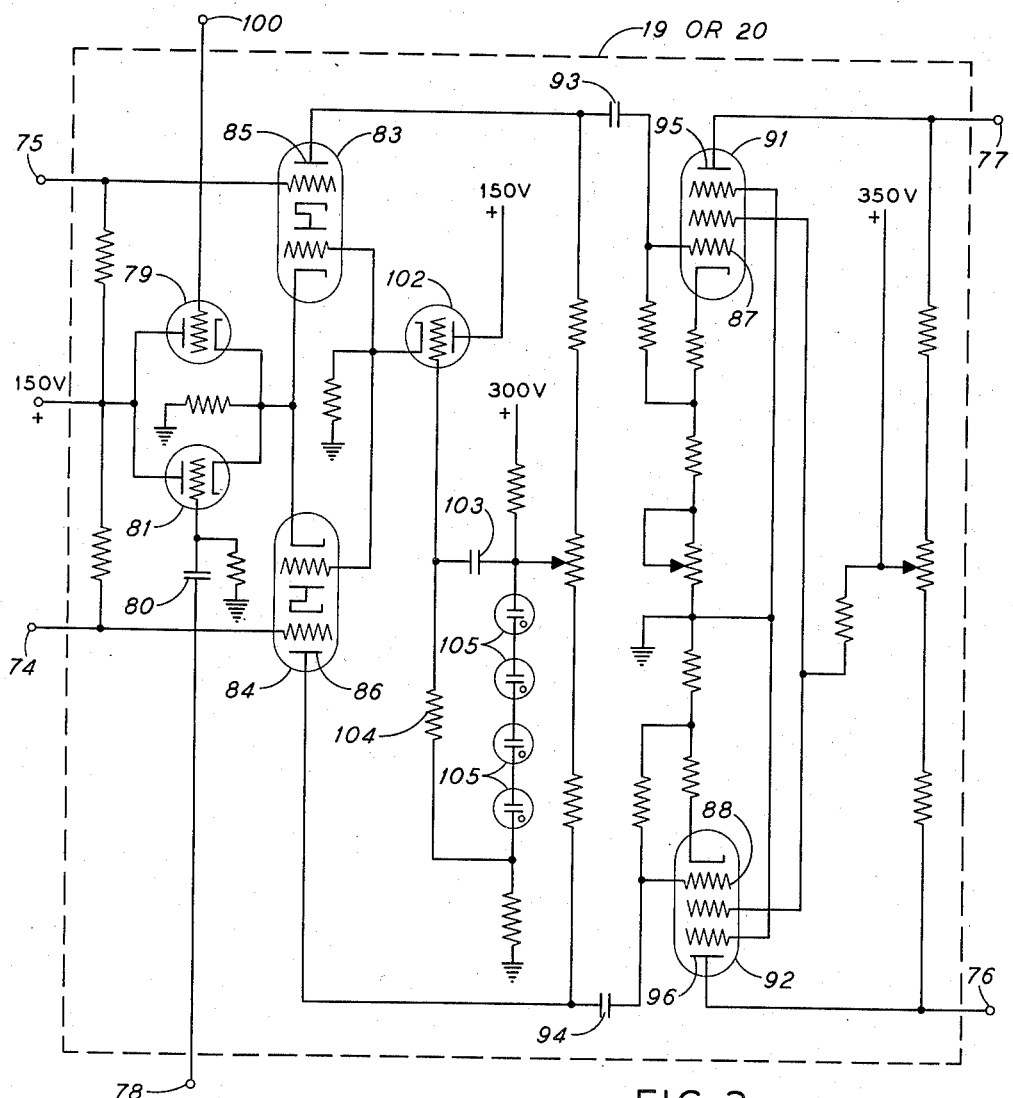
Fig. 3 is a schematic wiring diagram illustrating one form of apparatus for modulating the electron beam of the storage tube in the apparatus of Fig. 1A.

With particular reference to the circuits for producing the circular scanning of the cathode ray beam and the positioning of electrostatic charges on the circular storage surface, reference may be had to Fig. 3, wherein there is particularly illustrated a preferred form of modulator, useful for either horizontal or vertical deflection of the electron beam, depending upon the phase of the alternating current voltage supplied thereto.

The input terminals to modulators 19 or 20 include those identified as 74 and 75 to which the alternating current voltage, as either a sine or cosine wave, is applied, while the output terminals identified as 76 and 77 are arranged to apply a comparable signal either to the vertical deflection plates 21 or the horizontal deflection plates 22. The arrangement of the modulator shown in Fig. 3 is such that with a pure sine wave applied to the input terminals 74 and 75, there is obtained at the output terminals 76 and 77 a similar pure sine. Similarly, a cosine wave at the input produces a wave of corresponding character at the output. Thus, it will be seen that when an unmodulated wave is applied simultaneously by both modulators 19 and 20 to the horizontal and vertical deflection plates, there is provided a circular scanning motion of the cathode ray beam around the target surface 17 of storage tube 14. Further in accordance with the invention, however, as mentioned above, the amplitude of the sine and cosine voltages at the deflection plates is such that, with zero signal applied, the beam circumscribes a circle of maximum diameter. This may either be slightly greater than the maximum diameter of the target, or may be substantially equal to that diameter.

In the writing operation, that is, when it is desired to store electrostatic charges on surface 17, in accordance with the individual energies of the incoming gamma rays detected by the system, there is applied from the linear pulse amplifier 43 a pulse of potential capable of reducing the amplitude of either and/or both the sine and cosine waves available at the output terminals 76, 77 of both modulators. This pulse, in the present embodiment, is applied through input terminal 78 and capacitor 80 to the grid of tube 81, which, for reason to be described hereinafter, is connected in a cathode follower circuit to the first cathodes of tubes 83 and 84. In the arrangement of Fig. 3, a pulse of predetermined amplitude entering the modulator decreases the amplitude of the output sine or cosine wave by applying a signal of corresponding magnitude and duration to the grids 87 and 88 of output tubes 91 and 92. As shown, grids 87 and 88 are coupled to the plates 85 and 86 of tubes 83 and 84. This coupling is through a conventional push-pull circuit which includes condensers 93 and 94. Plates 95 and 96 of output tubes 91 and 92 are, in turn, directly coupled to the deflection plates 21 or 22 through output terminals 76 and 77.

As mentioned hereinabove, the input circuit to the first amplifying tubes 83 and 84 of the modulator of Fig. 3 is by way of a cathode follower circuit which includes input decoupling tubes 79 and 81. The grid of tube 79 is directly coupled to the input terminal 100, which in the present arrangement is adapted to be connected to saw-tooth generator 56 through the relay 50. The saw-tooth generator, which is further illustrated in Fig. 4 and will be described hereinafter, produces essentially a linearly varying D. C. potenital, useful in transmission of signals over the well logging cable, so that there may be generated at the output terminals 76 and 77 a progressively decreasing or increasing amount of deflection potential on both the horizontal and vertical deflection plates for scanning storage surface 17 of cathode storage tube 14 in a spiral. Thus, the cathode follower circuit, including tubes 79 and 81, provides a decoupling arrangement whereby the unidirectional pulses of microsecond duration may be applied to the modulators and deflection plate circuits during the writing or storage phase, and a D. C. signal may be applied during the reading or transmission phase.

For the purpose of improving linearity and stability of operation either during application of the D. C. signal applied through tube 79 or during modulation by the high-frequency pulses through tube 81, there is provided a negative feedback circuit to tubes 83 and 84 which includes tube 102 connected in a cathode follower circuit which additionally comprises condenser 103, resistor 104 and the gas-filled diodes 105. The diodes 105, of course, provide a D. C. potential droppping circuit during the application of the linearly modulated D. C. signal by the saw-tooth generator while signal transmission is being made to the earth's surface. The condenser 103 provides the desired feedback coupling during application of the high-frequency pulses by linear pulse amplifier 43 in response to the arrival of each gamma ray at detector 29.

Figure 4:
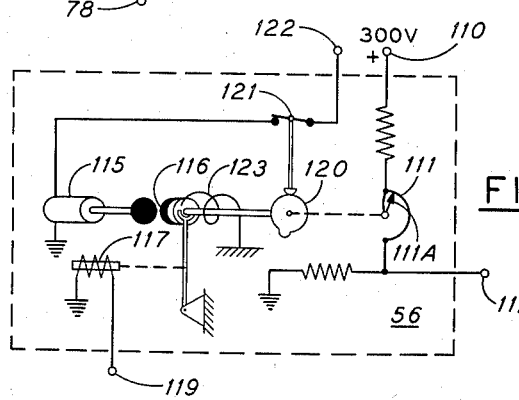
Fig. 4 is a schematic representation of a preferred form of saw-tooth generator as contemplated in the apparatus of Fig. 1A.

There is particularly shown in Fig. 4, as mentioned above, a suitable arrangement for generating a linearly varying D. C. potential which may be applied through relay 50 by way of contact 48 to the input terminal or line 100 of the modulator of Fig. 3. This signal may be generated from a conventional D. C. source, such as the 300-volt terminal, designated 110, and the resistor network which includes motor-driven potentiometer 111, one end of which is connected to the output terminal 112. The method of linearly varying the potential is performed by moving contact 111A from a position in which substantially the entire resistance of potentiometer 111 is included in the network, until movable contact 111A is rotated to substantially exclude the resistance of potentiometer 111. Potentiometer 111 is preferably linearly wound but, of course, may be given any desired functional relationship, such as logarithmic. In the present embodiment, this is accomplished by operation of the A. C. clutch-motor 115, whose clutch 116 is engaged by the operation of a solenoid 117 in response to a D. C. potential applied through terminal 119. As shown, with the clutch engaged, the motor shaft drives contact 111A along potentiometer 111, and simultaneously rotates cam 120 until such time that cam 120 opens switch 121, thereby disconnecting alternating current supplied through terminal 122 to drive motor 115. As indicated, the cam is reset to its closed position by coil spring 123, which reverses the direction of cam 120 and contact 111A when solenoid 117 releases clutch 116. Solenoid 117 is energized through contact 49 of control relay 50 so that the desired saw-tooth voltage is generated when "read-out" or recording is desired at the earth's surface.

Figure 5:
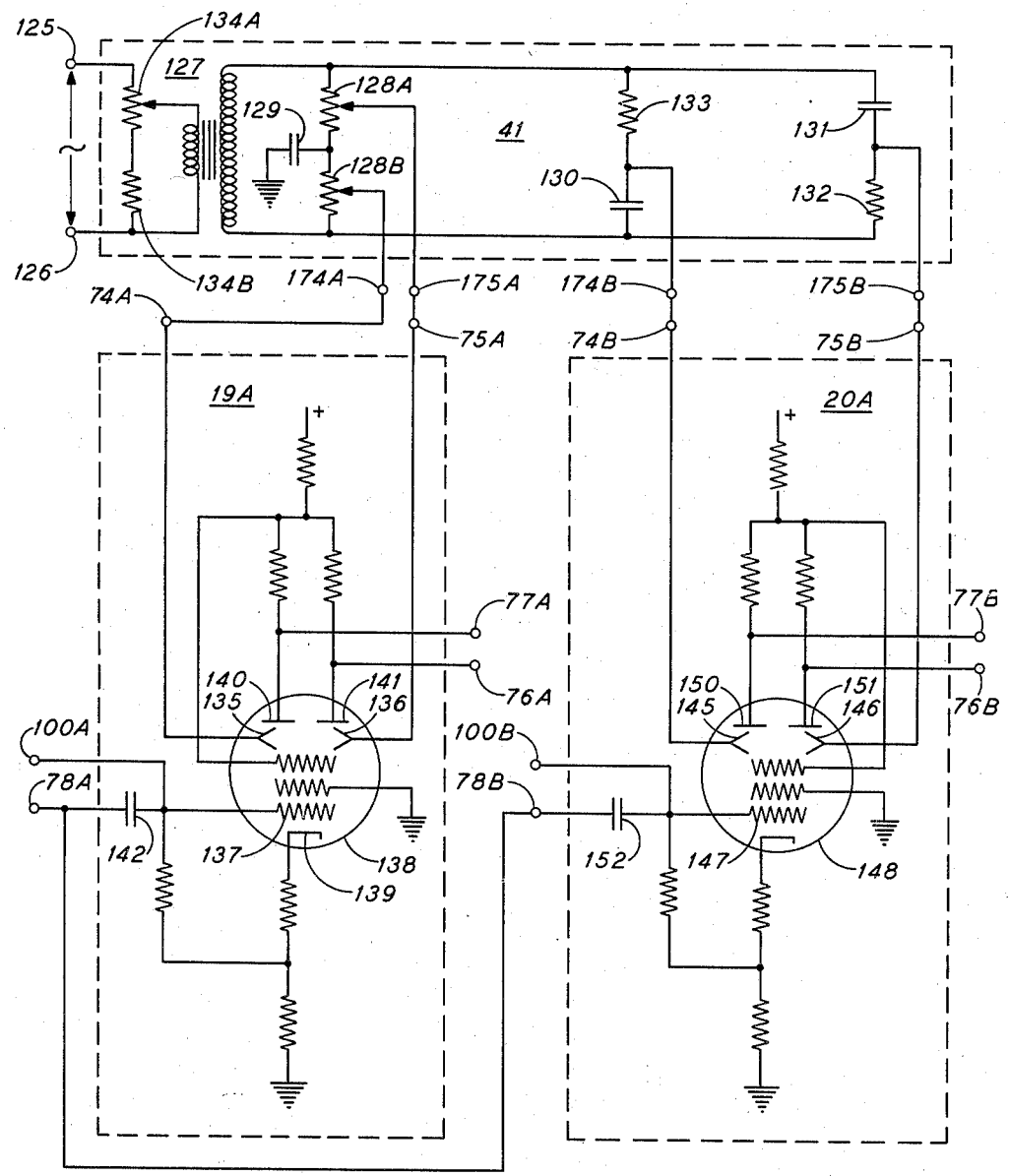
Fig. 5 is an alternative arrangement for the vertical and horizontal modulators, as well as the ninety-degree phase-shift circuit which may be utilized in the arrangement of Fig. 1A.

There is illustrated in Fig. 5 an alternative arrangement for modulators 19 and 20, which are identified as 19A and 20A, respectively. These modulators may be substituted for the modulator particularly shown and described in connection with Fig. 3. Fig. 5 also discloses one suitable form of ninety-degree phase-shift network, identified as 41 in Fig. 1A, which either may be employed with the modulators 19A and 20A, as shown in Fig. 5, or used with a pair of modulators similar to those shown in Fig. 3. As particularly shown in Fig. 5, phase-shift network 41 is connected to a source of alternating current, such as oscillator 39 in Fig. 1A, through terminals 125 and 126. These terminals are connected in series with the primary of transformer 127 through a potential varying circuit including resistors 134A and 134B. The secondary winding of transformer 127 is connected in series with a pair of variable resistors 128A and 128B, with the junction between the resistor connected to ground through condenser 129. This circuit provides a sine wave potential across the one set of output terminals, such as 174A and 175A, which are connected to the input terminals of the horizontal modulator 19A. Simultaneously, there is developed across output terminals 174B and 175B a cosine wave, exactly ninety degrees out of phase with the above sine wave output. This signal is developed across an RC network comprising condensers 130 and 131 and resistors 132 and 133, with terminal 174B connected between condenser 130 and resistor 133 and terminal 175B between condenser 131 and resistor 132.

As further shown in Fig. 5, the input terminals 74A and 75A are connected to a pair of electrostatic focusing plates 135 and 136 of an amplifying tube of the type known as a sheet-beam tube 138. In this tube, the electron stream emanating from cathode 138 is normally distributed evenly and equally between a pair of plates 140 and 141, but, under the influence of the potentials applied across deflecting electrodes 135 and 136, the potential developed across output terminals 77A and 76A may be sinusoidally varied in response to the input potential applied by the sine wave generator portion of the phase shifting network 41. In similar manner, the beam-deflecting electrodes 145 and 146 of tube 148 control the signal developed across output terminal 76B and 77B of modulator 20A by the circuits through plates 150 and 151 of tube 148. The input circuit of tubes 138 and 148 of the modulators 19A and 20A, respectively, is controlled through the grids 137 and 147, respectively.

As shown, the control grids in each case are connected through a condenser, such as 142 and 152, to the respective input terminals 78A and 78B, through which the high-frequency-type pulses are applied to the modulators. While the linearly varying D. C. potential used in the reading, or transmitting, operation has been shown to be a direct connection, respectively, from terminals 100A and 100B to control grids 137 and 147, it will be understood that a cathode follower coupling circuit may be employed, as in the embodiment of Fig. 3, to isolate the saw-tooth D. C. and pulsed input signals.

As described hereinabove, during the transmission or readout function of the system, the accumulated data on storage target 17 is preferably converted to a modulated D. C. signal by applying a saw-tooth D. C. voltage of substantially linearly increasing or decreasing amplitude from generator 56 to the horizontal and vertical modulators 19 and 20. This arrangement produces a spiral motion of the cathode ray beam across the area of the target screen 17, as illustrated by line 36' in Fig. 2B. It will, of course, be understood that the spiral line 36' is purely diagrammatic, since the line, in spiraling from the outer periphery to the center, or vice versa, will vary in radius only about the width of the cathode ray beam for each rotation around the center of the storage target surface. In practice, it may be desirable to substitute for the linearly varying D. C. voltage a signal which is essentially a modulated square wave, such that individual and substantially concentric circles may be described across the face of the tube, with each circle being of decreasing diameter from the periphery toward the center, in a series of steps. Thus, the entire surface may be scanned. This substitute signal may be generated by providing potentiometer 111 of generator 56 with a series of discrete resistance steps so that the D. C. signal applied by generator 56 to the modulators 19 and 20 will cause a change in the sweep radius of the cathode ray beam substantially equal to the width of the spot on target surface 17 at the end of each complete revolution.

A further modification in the method of generating a modulated D. C. signal during transmission of the spectrum may be provided by applying either a square-wave A. C. form of signal or D. C. pulses in place of the D. C. voltage as the input to terminal 110 of saw-tooth generator 56. Desirably, these voltage pulses, or the square wave, will be of such period and frequency that they will provide a deflection pulse into and out of modulator 19 and 20 of the same order of magnitude and duration as the pulses applied during the recording or writing function in storage tube 14. For example, a suitable square wave may have a frequency of about 50 kilocycles so that pulses of the order of 20 microseconds in length are periodically and regularly applied by generator 56 to the horizontal and vertical modulators 19 and 20. If D. C. pulses are used, rather than a continuous A. C. square wave, the unidirectional pulses may have a duty cycle of about the same on and off time. In the arrangement of saw-tooth generator 56 illustrated in Fig. 4, the square wave or pulsed D. C. signal as mentioned above is applied through terminal 110 and then varied by potentiometer 111 in step-wise sequence to attenuate the magnitude of the pulses from maximum to minimum potential. With such sequence stepping or attenuation of the applied signal, it is desirable to capacity-compensate each step of the potentiometer by shunting each discrete and equal resistance step with a comparable condenser valve so that each individual step will have essentially the same time constant. With either a square wave or pulse-type carrier wave being applied to the deflection plates of storage tube 14, surface 17 will be intermittently scanned in arcs of equal radius to detect the electrostatic charges deposited thereon, during the portion of each cycle when the pulse is at its crest or peak. Accordingly, the same circle of any predetermined radius will be scanned by these individual arcs and an output signal generated which is modulated in accordance with the information stored at that particular annular area. Of course, each circular or annular area of storage surface 17 scanned by the electron beam will desirably be traversed by the same number of pulses of the carrier signal. One advantage of this particular type of input signal to modulators 19 and 20 during the transmission or readout function is that D. C. amplifier 54 may be replaced by a simple, and more easily stabilized, A. C. amplifier whose output may be connected to the transmission line through a simple RC integrating circuit. This RC circuit, together with a simple detector stage, converts the high-frequency signal from tube 14, modulated in response to the number and distribution of electrostatic charge deposited at any one annular area of target 17, to a time-integrated D. C. signal of substantially low-frequency character. The further advantage of utilizing a square wave or D. C. pulse input during transmission is that the vertical and horizontal modulators may employ a single input line having a common input impedance, thereby avoiding the necessity of isolating the D. C. and pulse inputs, as is desirable with modulators of the type illustrated in Fig. 3.

While only a single embodiment of a logging sonde employing the principles of the present invention has been disclosed hereinabove, it will be understood that the present system for recording and transmitting high-frequency information over a low-frequency, low-power capacity cable may be readily adapted for the recording of other measured information obtained at the bottom of a long, narrow well bore. For example, a plurality of measurements of resistance, impedance, natural potential, magnetic field and other types of radioactive data may be accumulated either on an extended time basis at a single location or during the logging of several feet of lineal length of the bore hole, and then transmitted to the earth's surface by the method described hereinabove. As noted above, the method is particularly useful where the measured variable is obtained as a pulsed electrical signal of short duration and rapidly recurring in time.

While various other modifications and changes in the foregoing arrangement will occur to those skilled in the art, all such modifications and changes which fall within the scope of the appended claims are intended to be included therein.

I claim:

1. Well logging apparatus for recording a spectrum of gamma ray energies at the earth's surface comprising means for converting each of the individual gamma rays to an electrical pulse of magnitude corresponding to the energies of said rays, storage means for accumulating each of said pulses as an electrostatic charge in a well bore, said storage means including a cathode ray tube having an electrostatic storage surface of substantially circular configuration, means for circularly scanning said surface with a cathode ray beam, means for radially displacing said beam in proportion to the magnitude of said electrical pulses, means for deflecting said beam on said storage surface in response to the occurrence of an electrical pulse, said deflection being in accordance with the magnitude of said pulse, means for biasing said beam to a normally nonconductive condition, means for biasing said beam to a conductive condition when said electrical pulse has attained its maximum amplitude to deposit each of said electrostatic charges in arcs of substantially concentric circles on said surface corresponding to their magnitude and occurrence, means for generating a low-frequency signal for transmission over a well logging cable including means for circularly and radially moving a reading cathode ray beam across said surface, means for deriving from said storage surface a modulated low-frequency signal, said means including means for moving said beam in arcs of substantially concentric circles of progressively changing radius, and means for recording said low-frequency signal at the earth's surface.

2. Well logging apparatus for recording at the earth's surface a spectrum of neutron-capture gamma ray energies arising from formations traversed by a well bore comprising means for irradiating an earth formation with neutrons, means for detecting the energy of gamma rays arising from excited nuclei in said formation, means for generating electrical pulses of magnitude corresponding to the energy of each of said gamma rays, cathode ray storage means for accumulating said electrical pulses to record a spectrum of said energies, said storage means including an electrostatic storage surface upon which electrostatic charges of predeterminable magnitude may be temporarily stored, means for continuously scanning said storage surface with a cathode ray beam around a circle concentric to said storage surface, means for displacing the scanning of said beam in a radial direction in proportion to the magnitude of said pulses, means for biasing said beam to a normally nonconductive condition, means for biasing said beam to a conductive condition when said electrical pulse has attained its maximum amplitude, means for generating a low-frequency signal variable in accordance with the variations in position and density of the electrostatic field on said storage surface, including means for scanning said surface with a cathode ray beam modulated by a pulsating square wave whose amplitude is variable intermittently and in substantially equal steps to cause said cathode ray beam to scan said storage surface along arcs of substantially concentric circles, means for converting the pulsating output to a modulated D. C. signal, and means for recording variations in the amplitude of said modulated D. C. signal at the earth's surface in correlation with the depth of said apparatus in said well bore.

3. Well logging apparatus for recording at the earth's surface a spectrum of neutron-capture gamma ray energies arising from formations traversed by a well bore comprising means for irradiating an earth formation with neutrons, means for detecting the energy of gamma rays arising from excited nuclei in said formation, means for generating electrical pulses of magnitude corresponding to the energy of each of said gamma rays, cathode ray storage means for accumulating said electrical pulses to record a spectrum of said energies, said storage means including an electrostatic storage surface upon which electrostatic charges of predeterminable magnitude may be temporarily stored, means for continuously scanning said storage surface with a cathode ray beam around a circle concentric to said storage surface, means for displacing the scanning of said beam in a radial direction in proportion to the magnitude of said pulses, means for biasing said beam to a normally non-conductive condition, means for biasing said beam to a conductive condition when said electrical pulse has attained its maximum amplitude, means for generating a low-frequency signal for transmission of said spectrum to the earth's surface including means for radially moving said cathode ray beam across said storage surface and means for deriving from said storage surface during said radial movement of said cathode ray beam a modulated low-frequency signal, and recording said last-named signal at the earth's surface in accordance with the depth of said apparatus in said well bore.

4. Apparatus in accordance with claim 3 with the addition of means for increasing the intensity of said cathode ray beam to restore said electrostatic storage surface to a uniform potential throughout its area and simultaneously generate a D. C. signal modulated in accordance with the distribution and number of electrostatic charges positioned on said surface during reception of neutron-capture gamma rays and the generation of electrostatic charges in response thereto on the storage surface.

5. Well logging apparatus for recording a spectrum of nuclear energies at the earth's surface comprising means for converting each of the individual nuclear events occurring in an earth formation adjacent a well bore to an electrical pulse, each of said pulses having a magnitude corresponding to the energy of said event, storage means in said well bore for recording said electrical pulses, said storage means including a cathode ray tube having an electrostatic storage surface of substantially circular configuration, means for circularly rotating the cathode ray beam of said tube around the periphery of said storage surface, gating means for radially displacing said beam toward the center of said storage surface in proportion to the magnitude of said electrical pulses, means for registering said beam on said storage surface in response to an electrical pulse passing through said gating means to position electrostatic charges on said surface as arcs of a plurality of substantially concentric circles, switch means for energizing a transmission circuit to transmit the accumulated spectrum of electrostatic charges on said storage surface to the earth's surface, said transmission circuit including means for generating a signal of progressively varying amplitude, means for varying the scanning radius of said cathode ray beam in response to the amplitude of said signal to scan said surface in substantially a spiral motion, and means for recording the output of said transmission circuit generated during the spiral scanning of said surface in accordance with the depth of said apparatus in a well bore.

6. A well logging transmission system comprising an electrostatic storage means positioned in said well bore for accumulating a plurality of measurements of a physical condition in said well bore, said storage means including a cathode ray tube having a substantially circular electrostatic storage surface, means for circularly rotating the cathode ray beam of said tube about the center of said storage surface, gating means for radially displacing said beam relative to said center in response to the magnitude of the measured condition, means responsive to said gating means to cause said beam to vary the electrostatic charge on said surface along an arc of a circle substantially concentric with the center of said storage surface, means for generating an electrical signal for transmission to the earth's surface representing the accumulated data on said storage surface including means for applying a unidirectional potential to the deflection system of said cathode ray tube to vary the scanning radius of the cathode ray beam, means for deriving an output signal variable in amplitude in accordance with the position and extent of the electrostatic charges on said storage surface, and a low-frequency cable for conducting the derived signal to recording means at the earth's surface and for correlating said signal with the depth of said electrostatic storage surface in a well bore.

7. Apparatus for transmitting a spectrum of nuclear energies from a well bore to the earth's surface over a cable having limited load and frequency characteristics comprising means for converting the energy of each of a plurality of nuclear events occurring in said well bore to an electrical pulse of corresponding magnitude, an electrostatic storage means positioned in said well bore for recording the heights of said electrical pulses, said storage means including a cathode ray tube having a substantially circular electrostatic storage surface, beam deflection means for said tube including a vertical modulator and a horizontal modulator, means for simultaneously applying a sine wave A. C. potential to one of said modulators and a cosine wave A. C. potential to the other of said modulators, gating means for passing said electrical pulses to said modulators, said gating means including means for varying the accelerating potential on the cathode ray beam to record said pulses on said storage surface as arcs of a plurality of substantially concentric circles, means for generating a signal variable in accordance with the variations in position and density of the electrostatic field on said surface including means for scanning said surface with a cathode ray beam modulated by a unidirectional signal of progressively varying amplitude, means for deriving an output signal from said beam during scanning variable in response to the variations in said field, and cable means for transmitting the variations in amplitude of the derived output signal to the earth's surface for display of said spectrum of nuclear energies.

8. A system in accordance with claim 7 in which said unidirectional signal for modulating the cathode ray beam is a linearly varying current to cause said cathode ray beam to scan said storage surface in substantially a spiral motion, and the signal-deriving means includes a D. C. amplifier.

9. A system in accordance with claim 7 in which said unidirectional signal for modulating the cathode ray beam is a pulsating square wave whose amplitude is variable intermittently and in substantially equal steps to cause said cathode ray beam to scan said storage surface alongs arcs of concentric circles, and the signal-deriving means includes means for converting the pulsating output to a modulated D. C. signal.

10. Apparatus for displaying a spectrum of nuclear energies comprising means for converting the energy of each of a plurality of nuclear events to an electrical pulse of corresponding magnitude, a change modifiable electrostatic storage means for recording the heights of said electrical pulses, said storage means including a cathode ray tube having a substantially circular electrostatic storage surface, beam deflection means for said tube including a vertical modulator and a horizontal modulator, means for simultaneously applying a sine wave A. C. potential to one of said modulators and a cosine wave A. C. potential to the other of said modulators, gating means for passing said electrical pulses to said modulators, said gating means including means for varying the accelerating potential on the cathode ray beam to record said pulses on said storage surface as arcs of a plurality of substantially concentric circles, means for generating a signal variable in accordance with the variations in position and density of the electrostatic charge modification on said surface including means for scanning said surface with a cathode ray beam modulated by a unidirectional signal of progressively varying amplitude, means for deriving an output signal from said beam during scanning variable in response to the variations in said charge modification, and means for indicating the variations in amplitude of the derived output signal as a display of said spectrum of nuclear energies.

11. Apparatus for displaying a spectrum of nuclear energies comprising means for converting the energy of each of a plurality of nuclear events to an electrical pulse of corresponding magnitude, a charge modifiable electrostatic storage means for recording the heights of said electrical pulses, said storage means including a cathode ray tube having a substantially circular electrostatic storage surface, means for circularly rotating the cathode ray beam of said tube about the center of said storage surface, gating means for radially displacing said beam relative to said center in response to the magnitude of said electrical pulses, said gating means including means for varying the accelerating potential on the cathode ray beam to record said pulses on said storage surface as arcs of a plurality of substantially concentric circles, means for generating a signal variable in accordance with the variations in position and density of the electrostatic charge modification on said surface including means for scanning said surface with a cathode ray beam modulated by a unidirectional signal of progressively varying amplitude, means for deriving an output signal from said beam during scanning variable in response to the variations in said charge modification, and means for indicating the variations in amplitude of the derived output signal as a display of said spectrum of nuclear energies.

References Cited in the file of this patent

UNITED STATES PATENTS

| | | |
|---|---|---|
| 2,535,817 | Skellett | Dec. 26, 1950 |
| 2,632,801 | Donaldson | Mar. 24, 1953 |
| 2,686,268 | Martin et al. | Aug. 10, 1954 |